United States Patent [19]

Eichberger et al.

[11] 4,452,831

[45] Jun. 5, 1984

[54] METHOD FOR THE PRODUCTION OF FOILS FROM ELASTOMERIC MATERIAL

[75] Inventors: Walter Eichberger, Perchtoldsdorf; Alfred Blaschke, Guntramsdorf, both of Austria

[73] Assignee: Isovolta Osterreichische Isolierstoffwerke Aktiengesellschaft, Wiener Neudorf, Austria

[21] Appl. No.: 253,922

[22] PCT Filed: Jul. 21, 1980

[86] PCT No.: PCT/AT80/00025

§ 371 Date: Mar. 20, 1981

§ 102(e) Date: Mar. 20, 1981

[87] PCT Pub. No.: WO81/00257

PCT Pub. Date: Feb. 5, 1981

[30] Foreign Application Priority Data

May 14, 1980 [AT] Austria ................................ 2572/80

[51] Int. Cl.³ .......................... B05D 3/12; B05D 3/02
[52] U.S. Cl. .................................... 427/348; 427/366; 427/386; 427/389.9; 427/392; 427/393.5; 427/439
[58] Field of Search ................ 427/392, 386, 393.5, 427/365, 366, 389.9, 439, 348; 428/248, 261, 245, 264, 290, 227, 236; 29/17 R

[56] References Cited

U.S. PATENT DOCUMENTS

| | | | |
|---|---|---|---|
| 2,760,884 | 8/1956 | Graf, Jr. .......................... | 427/392 X |
| 2,886,473 | 5/1959 | Schroeder ........................ | 427/392 X |
| 3,857,728 | 12/1974 | Drelich et al. .................. | 427/392 X |
| 4,161,456 | 7/1979 | Sinn et al. ..................... | 427/389.9 X |
| 4,171,391 | 10/1979 | Parker ............................ | 427/392 X |
| 4,215,171 | 7/1980 | Marco et al. ................. | 427/389.9 X |
| 4,271,217 | 6/1981 | Tanaka et al. ................ | 427/385.5 X |

*Primary Examiner*—Thurman K. Page
*Attorney, Agent, or Firm*—Bierman, Bierman & Peroff

[57] ABSTRACT

A method for producing elastomeric foils by continuously impregnating a non-woven fabric with a resinous composition in liquid form selected from the group consisting of (a) a resin based on polyhydroxy compounds or polyamines or mixtures thereof and polyisocyanates, (b) resins based or polyhydroxy compounds or polyamines or polycarboxyl compounds or mixtures thereof and polyepoxides and (c) an impregnating mixture based on rubber latex, drying and curing the impregnated fabric freely suspended in hot air and removing the dried foil which is useful as an intermediate layer in the bonding of objects with a high E-molulus and the bonded object per se.

15 Claims, No Drawings

METHOD FOR THE PRODUCTION OF FOILS FROM ELASTOMERIC MATERIAL

TECHNICAL FIELD

The invention concerns a method for the production of foils of elastomeric material, as well as the use of these foils in bonding objects with a high E-modulus, particularly parts in the manufacture of skis, where the foil is inserted as an intermediate layer, which has the effect of reducing the shearing forces which can appear in the adhesive joint during the elastic deformation of the parts bonded to each other, hence particularly in ski production.

STATE OF THE ART

In the bonding of parts with a high E-modulus it is known to insert a rubber foil into the adhesive joint. This is done preferably by coating the surfaces to be joined with each other, as well as the surfaces of the rubber foil with an adhesive that hardens when heated, and then, after inserting the rubber foil as an intermediate layer between the surfaces to be joined with each other, bonding the whole by the application of pressure and heat supply.

In a ski manufacturing method, where a bonding method of this type can be used with advantage, the skis are produced first from at least substantially plate-shaped parts which are bonded with each other.

The deformations to be absorbed by the adhesive joints, when such a ski is stressed for bending, are generally the greater the more rigid the material of the parts to be bonded with each other is, and the shearing forces appearing in the adhesive joint are the greater, the greater these deformations are or the thinner the adhesive joints are. The known method for bonding two parts has the effect that these shearing forces remain within certain limits. The deformation appearing in the bonded zone under bending stress is now absorbed substantially by the intermediate rubber layer. The effect of these intermediate rubber layers is described in detail in Austrian patent application Ser. No. 351,416 of the applicant.

The use of these intermediate rubber layers in the bonding of parts with a high E-modulus is not without problems in practice. First of all, in order to obtain the quality and uniformity of the adhesive joint, the rubber foil used as an intermediate layer should have a thickness of about 0.1 to 0.2 mm with a possibly low thickness tolerance. Rubber foils in this thickness range are very difficult to produce, however, and only with a relatively high thickness tolerance. Thus, e.g. rubber foils with a thickness of 0.13 mm can only be obtained with a thickness tolerance of ±0.03 mm, and the quality that can be achieved when they are used as intermediate layers in adhesive joints is therefore limited. Besides, these rubber foils must be subjected additionally to a special surface treatment by wet-chemical methods to obtain a good adhesion in bonding their surfaces.

DESCRIPTION OF THE INVENTION

The invention is based on the problem of providing a method for the manufacture of foils of elastomeric material where the foils can be produced with a lower thickness tolerance than rubber foils and require no surface treatment to increase their adhesive power.

The problem underlying the invention is solved by the method for the production of foils of elastomeric material according to the invention, which is characterized in that a. resins based on polyisocyanates and polyhydroxy-compounds and/or polyamines, or b. resins based on polyepoxide compounds and polyhydroxy-compounds and/or polyamines and/or polycarboxyl compounds, or c. an impregnating mixture based on rubber latex are applied in liquid form in a continuous process on a unwoven fabric, which can preferably be a tangled unwoven fabric, and that the unwoven fabric passes through a zone of elevated temperature where the resins or the impregnating mixture harden and/or dry in foil form to an elastomer, containing the fibers of the unwoven fabric. The resins used in liquid form can be present with advantage in the form of dispersions.

According to an advantageous embodiment of the method according to the invention, when resins based on polyisocyanates are used, these resins are reactive resins of at least one polyisocyanate components and one polyhydroxy-component, which can contain preferably a preliminary product of polyisocyanates and polyhydroxy-compounds. At least one of the polyhydroxy-compounds used in the preparation has the formula

where A denotes one of the groups $-CH_2-$ or $>C=O$ and $(m+q)$ assumes the values 4 to 30. In the meaning of $A=-CH_2-$, n can assume with advantage the value 3, p the value 4, and $(m+q)$ the values 6 to 30, and in the meaning of $A=>C=O$, n can assume the value 4, p the values 2 to 6, and $(m+q)$ the values 4 to 20.

According to another advantageous embodiment of the method according to the invention, when using an impregnating mixture based on rubber latex, this mixture can contain a carboxylated styrene-butadiene-latex and, if necessary, additionally a vulcanizing agent which can be preferably a formaldehyde condensation product. The solid content of the formaldehyde condensation product used in the mixture can be preferably 5 to 30% by weight.

In another advantageous embodiment of the method according to the invention, the impregnating mixture contains additionally a natural rubber latex, where the solid ratio of styrene-butadiene-latex to natural rubber latex is preferably between 1:2 and 2:1.

It was found that foils with a thickness of 0.1 to 0.2 mm can be produced with the method according to the invention with a relatively low thickness tolerance of ±10%. This is due to the fact that the unwoven fabrics used have an absorption power which is uniform over their entire surface, and the resin or impregnating mixture, which is in liquid form, can be applied evenly by means of known proven methods, e.g. by impregnation or brushing. The resins or impregnating mixtures according to the invention are not sticky without special additives, as long as they are in liquid form, which has the result that the application of the liquid resin on the bonded fabric presents no problem. The solid elastomer formed is only sticky in the partly hardened or dried state, that is, while the unwoven fabric laden with the resin or impregnating mixture passes through the zone of elevated temperature, hence during its passage through a continuous furnace. During this passage, the unwoven fabric can be conducted contact-free, e.g. suspended on an air cushion. This way technical problems, which can be caused by the stickiness of the drying or hardening elastomer, are avoided in a simple manner.

In the finished foil, the fibers of the unwoven fabric no longer form a continuous matrix, so that they do not decisively alter the mechanical properties of the elastomer.

The invention also concerns the use of the foil of elastomeric material obtained with the method according to the invention, which is characterized in that the foil, which has a thickness tolerance of ±10%, is arranged as an intermediate elastomer layer in the adhesive joint when bonding two parts with a high E-modulus.

The best way for realizing the invention

For the production of the foil we start from a tangled unwoven cotton fabric in web form, which is withdrawn continuously over a winding mandrel and then conducted over guide rollers through a tank containing the impregnating resin or impregnating mixture, and subsequently through a pair of squeezing rolls to calibrate the resin coat.

When using an impregnating resin, the composition of which will be described below in three examples, this impregnating resin has preferably an impregnating viscosity in the range of 10,000 to 100,000 mPa, the optimum viscosity value depending on the gross density of the tangled unwoven fabric used, and which can be adjusted, if necessary, by the addition of a suitable non-reactive solvent.

When using an impregnating mixture based on rubber latex, which is present in the form of an aqueous dispersion, and for the composition of which two formulas are given below, this impregnating mixture has preferably an impregnating viscosity of 50 to 500 mPa, where the optimum viscosity value—similar as with the use of impregnating resins-depends on the gross density of the tangled non-woven fabric and can be adjusted, if necessary, by the addition of water.

After passing through the impregnating plant and the squeezing rolls, the impregnated web enters a hot air shaft in which is passes freely suspended through several separately controlled heating zones, and at the end of which it is withdrawn as a non-sticky foil web, and then wound as an endless band.

The following table contains for different thicknesses of the foil to be produced the quality of the non-woven fabric used and of the resin-or impregnating coat (in percent of the gross weight of the fabric, and calculated in the dried and/or hardened state).

| Foil thickness in mm | Tangled non-woven cotton fabric weight in g/m² | Coat % |
|---|---|---|
| 0.15 | 18 | ab. 400 |
| 0.20 | 26 | ab. 650 |
| 0.25 | 26 | ab. 900 |

Here are the five preferred impregnating resin formulas:

1. For the production of a solvent-free impregnating resin, a preliminary product is prepared from (all values are in parts by weight)

66 parts diphenylmethane-4,4'-diisocyanate as a technical crude product (NCO-content ab. 31%) (bought under the tradename Desmodur VL by BAYER) and 200 parts of a linear polyether containing hydroxyl groups with an average molar weight of 2000 and an OH-content of 1.7% (bought under the trade name Desmophen 1900U by BAYER) with 0.6 parts zinc octate as a catalyst to which 7 parts 1,4-butanediol are added at room temperature.

The gelling time of the impregnating resin thus produced is more than 4 hours at room temperature.

2. For the production of an impregnating resin, a mixture is formed at room temperature which consists of (in parts by weight)

212 parts of a 67% solution of a preliminary product of trimethylolpropane-toluylenediisocyanate with a NCO-content of about 11.5% and an equivalent weight of about 262 in ethylglycol acetate as a solvent (bought under the tradename Desmodur by BAYER), 98 parts of a branched polyether ester containing hydroxyl groups with content of about 5% OH and an equivalent weight of about 340 (bought under the tradename Desmophen 1150 by BAYER), 245 parts of a linear polyester containing hydroxyl groups with a content of about 1.7% OH and an average molar weight of about 2000 (bought under the tradename Desmophen 1652 by BAYER), as well as 0.5 parts N-methylmorpholine as a catalyst.

The impregnating resin thus prepared has a gelling time of more than 12 hours at room temperature.

3. For the production of an impregnating resin, a mixture of (in parts by weight)

66 parts polytetrahydrofuran (molar weight ab. 650) as a polyhydroxy-component, 33.3 parts isophorone diisocyanate 6.3 parts 1,3-butanediol 20 parts ethylglycol acetate and 0.03 parts dibutyl-tin-dilaurate was heated under constant stirring to 75 deg. C., and the stirring was continued until the polyaddition reaction was completed (disappearance of the NCO-conent), and then cooled.

The impregnating resin obtained by adding to this mixture 25.3 parts of a technical trimethylol-toluylene diisocyanate adduct in the form of a 67% solution in ethylglycol acetate.

The gelling time of the impregnating resin thus produced is more than 6 hours at room temperature.

4. For the production of the impregnating resin were mixed (in parts by weight)

41.5 parts polycaprolactone (molar weight ab. 830) as a polyhydroxy-component, and 20 parts ethylglycol acetate to obtain a clear solution.

The impregnating resin is then obtained by adding to this solution 42 parts of a trimethylol propane-isophorone-diisocyanate adduct in the form of a 70% solution in ethylglycol acetate The gelling time of this impregnating resin is more than 8 hours at room temperature.

5. The impregnating resin consists of a mixture produced at room temperature of (in parts by weight)

100 parts of a copolymer of butadiene-acrylonitrile containing carboxyl end groups, with an average molar weight of 3300 and a carboxyl functionality of ab. 1.8

12 parts glycerin triglycide ether with an epoxide equivalent of ab. 120–140, 0.5 parts 2,4,6-tris-(dimethylaminomethyl)-phenol 20 parts furnace soot 40 parts toluene as a solvent.

This impregnating resin has a gelling time of more than 24 hours at room temperature.

Here are two preferred formulas for impregnating mixtures based on rubber latex.

6. For the production of an impregnating mixture based on rubber latex are mixed (in parts by weight)

100 parts (related to the dry substance) of a carboxylated butadiene-styrene-copolymer latex with a styrene portion of 45% and a carboxylic acid portion of 3% by weight in the copolymer, and 30 parts (related to solid resin) of a methyl-etherified melamine-formaldehyde-resin whose melamine-formaldehyde ratio is 1:3.1, where the total portion of dry substance is set to about 55% by weight.

The stability of this impregnating mixture in storage is about 12 hours.

7. In a preferred variant of this impregnating mixture according to formula 6, are added 65 to 260 parts (related to the rubber dry substance) of a 60% centrifuged commercial available natural latex stabilized with 0.7% ammonia.

With this addition of natural latex, the mechanical toughness of the resulting elastomer can be increased or adjusted to the desired value within a wide range.

Industrial utilization

The foils produced with the method according to the invention are used for bonding, particularly in metal-metal bonding, and especially in the manufacture of skis, where they are inserted as intermediate layers in the adhesive joints. If commercial adhesives on an epoxide resin base are used, the bonding qualities are good and very uniform. Drum peeling tests according to DIN 53295 show high peel strength values.

We claim:

1. A method of producing elastomeric foils comprising continuously impregnating a non-woven fabric with a resinous composition in liquid form selected from the group consisting of (a) a resin based or polyhydroxy compounds or polyamines or mixtures thereof and polyisocyanates, (b) resins based on polyhydroxy compounds or polyamines or polycarboxyl compounds or mixtures thereof and polyepoxides and (c) an impregnating mixture based on rubber latex to form a sticky foil, drying and curing the impregnated fabric in the form of a sticky foil freely suspended in hot air and removing the dried non-sticky, elastomeric foil.

2. The method according to claim 1, characterized in that a tangled bonded cotton fabric is used as said unwoven fabric.

3. The method according to claim 1, characterized in that said resinous mixture used in liquid form are present in the form of dispersions.

4. The method according to claim 1, characterized in that, when resins based on polyisocyanates are used, these resins are reactive resins of at least one polyisocyanate component or one polyhydroxy component.

5. The method according to claim 4, characterized in that at least one of the polyhydroxy components used in the preparation of the resin has a structure of the formula

where A denotes one of the groups $-CH_2$ or $>C=O$, and $(m+q)$ assumes the values 4 to 30.

6. The method according to claim 5, characterized in that when $A = -CH_2-$, n assumes the value 3, p the value 4, and $(m+q)$ the values 6 to 30.

7. The method according to claim 5, characterized in that when $A = >C=O$, n assumes the value 4, p the values 2 to 6, and $(m+q)$ the values 4 to 20.

8. The method according to claim 1, characterized in that the reactive resins contain at least one preliminary product of polyisocyanates and polyhydroxy-compounds.

9. The method according to claim 1, characterized in that, when an impregnating mixture based on a rubber latex is used, this mixture contains a carboxylated styrene-butadiene-latex.

10. The method according to claim 9, characterized in the impregnating mixture used contains additionally a vulcanizing agent.

11. The method according to claim 10, characterized in that said vulcanizing agent is a formaldehyde condensation product.

12. The method according to claim 11, characterized in that the solid content of the formaldehyde condensation product used in the impregnating mixture is 5 to 30% by weight.

13. The method according to claim 1, characterized in that said impregnating mixture contains additionally a natural rubber latex.

14. The method according to claim 13, characterized in that the solid ratio styrene-butadiene-latex to natural rubber latex is between 1:2 and 2:1.

15. Foil of elastomeric material, characterized in that it is produced according to claim 1.

* * * * *

UNITED STATES PATENT AND TRADEMARK OFFICE
CERTIFICATE OF CORRECTION

PATENT NO. : 4,452,831
DATED : June 5, 1984
INVENTOR(S) : Walter Eichberger et al.

It is certified that error appears in the above-identified patent and that said Letters Patent is hereby corrected as shown below:

On the title page item [30] should read

-- [30]   Foreign Application Priority Data

July 24, 1979 [AT]   Austria..........5087/79

May 14, 1980 [AT]   Austria..........2572/80      --.

Signed and Sealed this

Seventh Day of May 1985

[SEAL]

Attest:

DONALD J. QUIGG

Attesting Officer    Acting Commissioner of Patents and Trademarks